May 13, 1958 S. M. HELLMAN 2,834,391
RELEASABLE SECURING MEANS
Filed July 16, 1954
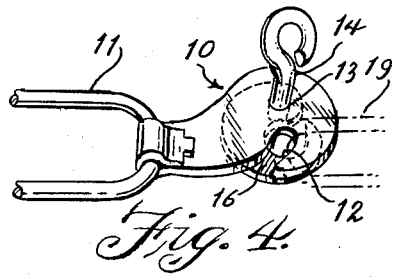
Fig. 4.
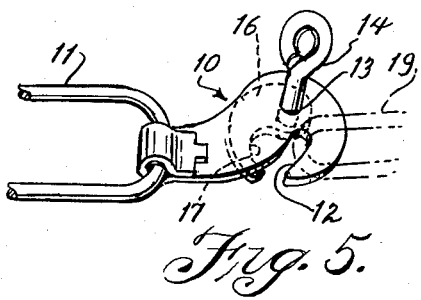
Fig. 5.
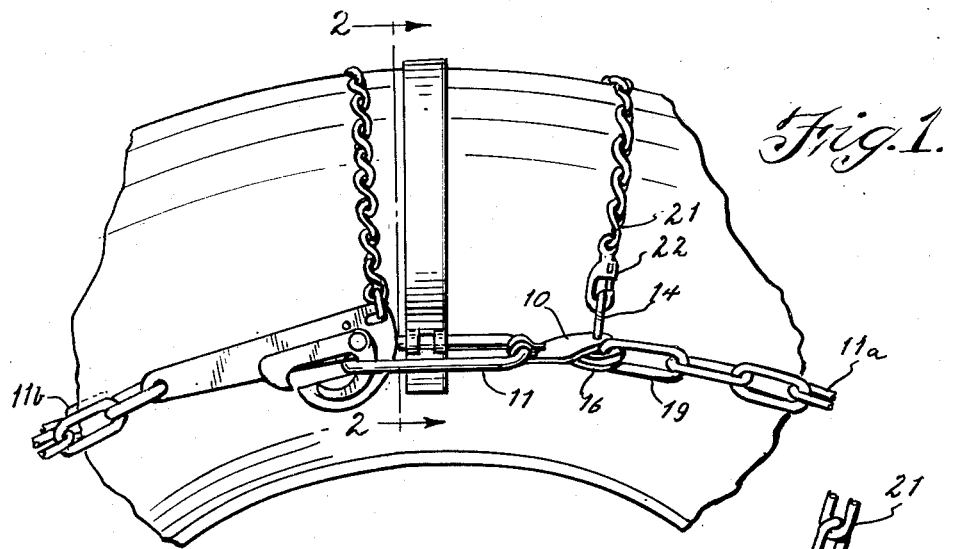
Fig. 1.
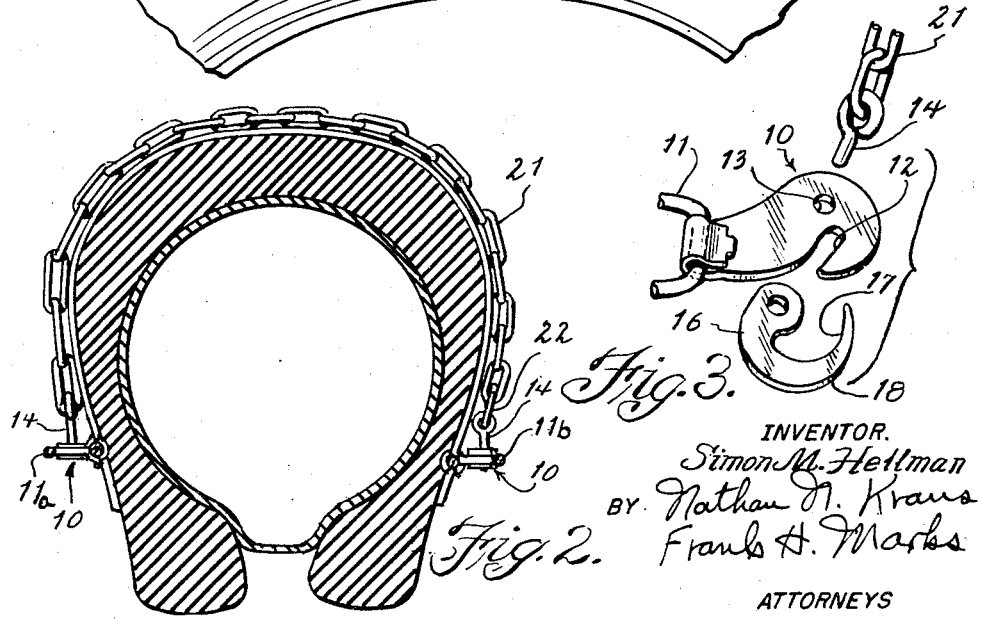
Fig. 2.
Fig. 3.
INVENTOR.
Simon M. Hellman
BY Nathan N. Kraus
Frank H. Marks
ATTORNEYS

United States Patent Office 2,834,391
Patented May 13, 1958

2,834,391

RELEASABLE SECURING MEANS

Simon M. Hellman, Waukegan, Ill.

Application July 16, 1954, Serial No. 443,778

2 Claims. (Cl. 152—213)

My invention relates to improved means for releasably securing anti-skid tire chains and the like.

It is known that the mounting and removal of conventional anti-skid tire chains on and from tires has been attended with considerable inconvenience and difficulty on the part of an automobile operator to the extent that many such operators, if required to use chains, prefer to have the same applied and removed by an attendant at a garage or service station in order to avoid reaching in under the car behind the rear wheels to effect securement and disengagement of the tire chain on the tires. Of course such service is not always available or conveniently accessible and an automobile operator is frequently required to perform the unpleasant task himself. In my co-pending applications Serial Numbers 415,773 and 421,238, now abandoned, there are described means for automatically coupling tire chains on tires whereby an automobile operator may mount tire chains on his automobile with a minimum of inconvenience and effort.

The instant invention is related to means for releasably securing anti-skid tire chains on tires and has for its prime object the provision of means which permits easy and convenient uncoupling of the side chain members of anti-skid tire chains without requiring an operator to reach in behind the wheels to release the inner side chain members so as to permit removal of the chains from the tires.

Another object of my invention is the provision of means for effecting positive securement of chains and more particularly easy disengagement of such chains even when the same are under tension.

Another object of my invention is the provision of releasable securing means of the foregoing character which is simple in construction, efficient and positive in operation and economical to manufacture.

Other and further objects of my invention will become apparent from the following description when considered in connection with the accompanying drawings, in which, Fig. 1 is a fractional elevational view of a tire showing my invention incorporated in an anti-skid chain applied to the said tire.

Fig. 2 is a cross sectional view taken on line 2—2 of Fig. 1.

Fig. 3 is a perspective view of the parts embodied in my invention and showing the same in exploded relation.

Fig. 4 is a perspective view showing the securement means of my invention in closed position.

Fig. 5 is a similar view showing the securement means in open position.

Referring to the drawings, my invention is shown embodied in an anti-skid tire chain construction in which there are incorporated features described in my co-pending applications Serial Numbers 415,773 and 421,238, now abandoned. It will be understood, however, that while my invention is illustrated as used with conventional anti-skid tire chains its use is not limited to such. It is contemplated that my invention may be used in other applications in which it is desired to releasably secure the ends of chains or cables or the like.

My improved releasable securing means comprises a substantially flat hook-shaped member generally indicated by the numeral 10 and formed as by stamping or forging and suitably secured to one end of a side chain member 11 or the like by reversely bending the end thereof, as illustrated in the drawings, or by otherwise securing the end in any suitable manner. The member 10 includes a slot 12 which extends inwardly from the side thereof and in a forwardly inclined direction. Spaced from the slot 12 but in close proximity to the inner end thereof is a perforation 13. An eye member 14 has its shank passing through said perforation and on the end of said shank is suitably secured, as by welding, a dog member 16 which is substantially C-shaped, the said member being arranged so that the opening 17 thereof is disposed in opposed relation to the slot 12, the outer edge 18 of the said dog member constituting a camming surface for a purpose as will be hereinafter described. As will be apparent when the eye member 14 is rotated the dog member 16 will rotate simultaneously therewith in either direction.

The slot 12 is adapted to receive the end link 19 of a chain, in this instance the opposite end of chain member 11 and when the dog 16 is rotated to assume the position illustrated in Fig. 4 the link 19 is secured against inadvertent dislodgement. Frequently when chains or cables are hooked together and under tension it is difficult to effect disengagement of the ends thereof, since it is required to manually relieve the tension so as to permit one end of a chain to be unhooked from the other. With my invention such disengagement is very easily accomplished, the same being effected merely by rotating the dog 16 in a clockwise direction as viewed in Fig. 5 so that the camming edge 18 engages with the link 19 urging the same outwardly of the slot 12. Depending upon the degree of tension of the chain at any particular time, the eye portion of the eye member 14 may be grasped as with fingers and rotated or a screw driver or pin may be inserted through the eye portion so as to increase the leverage and thereby obtain a mechanical advantage.

As was previously noted considerable inconvenience attends the mounting and demounting of anti-skid chains on tires, since it is required to reach behind the tires both to effect engagement and disengagement of the ends of the side chain members. In my copending applications, Serial Nos. 415,773 and 421,238, now abandoned, there are described means for automatically coupling tire chains on tires whereby there is eliminated the necessity for reaching in behind the tire to secure the inner side chain member. While the mounting of tire chains is satisfactorily accomplished according to the means described in the foregoing applications, there still remains the problem of effecting disengagement of the side chain members when it is desired to remove the chains from the tires. In accordance with my invention I provide on both the inner and outer side chain members 11a and 11b respectively identical releasable securing means as hereinbefore described and secure preferably permanently to the eye member 14 on the inner chain member 11a a tread chain 21, the opposite end of the said chain being provided with a detachable fastening element 22 of a well known type as illustrated in Fig. 1. After engagement of the member 10 with the end of side chain 11a is effected, the tread chain 21 is twisted axially so as to rotate the dog 16 and dispose the same in the position illustrated in Fig. 4 in which the link 19 is locked in the slot 12 against separation from the member 10. After the end link of the outer side chain member 11b is engaged in the slot 12 of the corresponding member 10 and the corresponding eye member 14 rotated to dispose the dog 16 in the position illustrated in Fig. 4 the fastening element 22 on the end of the tread chain is hooked into the eye portion of the outer member 14. With the tread chain in this position it will be apparent that the inner and outer dogs are locked against rotation and are retained in such position.

When it is desired to remove the anti-skid chains from the tires the fastening element 22 is first disengaged from the outer eye member 14 and by twisting the tread chain 21 while grasping the same at the end thereof, the inner dog 16 is caused to be rotated so that the edge 18 thereof engages the link 19 and cams the same out of the slot 12 to thereby effect disengagement of the chain ends. The outer eye member 14 may then be rotated in any suitable manner to similarly cam the corresponding link out of the corresponding slot thereby effecting complete separation of the chain ends.

It will be understood that when the releasable securing means of my invention, as hereinabove described, are used in combination with the automatic coupling means illustrated in Fig. 1, the said means are secured to the end links of the side chain members and arranged in locking position before the anti-skid tire chain is mounted on a tire.

Where the releasable securing means of my invention constitute the only means by which the tire chain may be secured on a tire, it will be understood that in the mounting operation the dogs 16 are first rotated to open the slots 12 to receive the end links of the side chain members. Thereafter the dogs 16 are rotated to locking position as hereinbefore described.

Various changes coming within the spirit of my invention may suggest themselves to those skilled in the art. Hence I do not wish to be limited to the specific embodiments described or uses mentioned, but intend the same to be merely exemplary, the scope of my invention being limited only by the appended claims.

I claim:

1. In an anti-skid chain formed of a pair of side chains and a plurality of transverse tread chains, means for releasably coupling the ends of said side chains together, said means comprising a substantially flat hook element secured to one end of each of said side chains, a flat substantially C-shaped member pivotally secured at one end to each of said hook elements and each rotatable in a plane adjacent the plane of a respective hook element, each of said members being rotatable to a position to extend across the open portion of a respective hook element to lock a chain end to said hook element, said C-shaped member constituting camming means whereby when said member is rotated in an opposite direction the outer edge of said member is caused to trasverse the open portion of a respective hook element to cam the chain end out of the open portion of a corresponding hook element, means secured to each of said members for rotating the same, a transverse tread chain having a first end operatively secured to one of said last-mentioned means, and having a second end releasably secured to the other of said last-mentioned means, said tread chain when disconnected at said second end and when twisted effecting rotation of said first end and the corresponding C-shaped member to urge a corresponding side chain out of engagement with a corresponding hook element.

2. In combination, an anti-skid chain including inner and outer longitudinal chain members, means for releasably coupling the ends of respective chain members together, said means comprising a substantially flat hook element secured to one end of each of said chain members and engaging the end link of a corresponding opposite end of a chain member, a flat substantially C-shaped member pivotally secured at one end to each of said hook elements and rotatable in a plane adjacent the plane of a respective hook element, each of said members being rotatable to a position to extend across the open portion of a respective hook element to lock an end link to said hook element, said C-shaped member constituting camming means whereby when said member is rotated in an opposite direction the outer edge of said member is caused to traverse the open portion of a respective hook element to cam a respective end link out of the open portion of said hook element, a transverse tread chain secured to the C-shaped member associated with the inner chain member, the opposite end of said tread chain being releasably secured to the C-shaped member associated with the outer chain member, said tread chain when in securement with both inner and outer C-shaped members acting to lock both of said C-shaped members against movement, said tread chain when disengaged from said outer C-shaped member and when twisted serving to rotate said inner C-shaped member to cause the same to engage a corresponding end link and to cam said end link out of engagement with the hook element associated with the inner chain member, said outer C-shaped member being then rotatable to cam the end link associated with the outer chain member out of engagement with a corresponding hook element.

References Cited in the file of this patent

UNITED STATES PATENTS

| 436,653 | Folsom | Sept. 16, 1890 |
| 1,062,457 | Hadley | May 20, 1913 |
| 1,581,748 | Lund | Apr. 20, 1926 |
| 1,660,927 | Larsen | Feb. 28, 1928 |
| 2,493,760 | Herbrick | Jan. 10, 1950 |